US012620899B2

(12) United States Patent
Liu et al.

(10) Patent No.: US 12,620,899 B2
(45) Date of Patent: May 5, 2026

(54) BUCK-BOOST SWITCHING REGULATOR AND CONTROL METHOD THEREOF

(71) Applicant: Richtek Technology Corporation, Zhubei City (TW)

(72) Inventors: Tung-Hang Liu, KeeLung (TW); Chi-Jen Yang, Hsinchu (TW); Chun-Jen Yu, Taoyuan (TW); Tsung-Han Yu, Hsinchu (TW)

(73) Assignee: RICHTEK TECHNOLOGY CORPORATION, Zhubei City (TW)

( * ) Notice: Subject to any disclaimer, the term of this patent is extended or adjusted under 35 U.S.C. 154(b) by 247 days.

(21) Appl. No.: 18/625,511

(22) Filed: Apr. 3, 2024

(65) Prior Publication Data

US 2025/0132680 A1    Apr. 24, 2025

(30) Foreign Application Priority Data

Oct. 18, 2023    (TW) ................................. 112139728

(51) Int. Cl.
 H02M 3/158 (2006.01)
 H02M 1/00 (2006.01)
(52) U.S. Cl.
 CPC ....... H02M 3/1582 (2013.01); H02M 1/0025 (2021.05)
(58) Field of Classification Search
 CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16;

G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247;

(Continued)

(56) References Cited

U.S. PATENT DOCUMENTS 8,508,208 B2 * 8/2013 Klein ................... H02M 3/1582
 323/284
2006/0006850 A1 * 1/2006 Inoue ................ H02J 7/007182
 323/265

(Continued)

*Primary Examiner* — Jeffrey A Gblende
(74) *Attorney, Agent, or Firm* — Tung & Associates

(57) ABSTRACT

A buck-boost switching power circuit comprises a bypass control circuit which configured to determine whether the buck-boost switching power circuit operates in a bypass mode according to a bypass enable signal. When the conversion voltage difference between the input voltage and the output voltage is less than a reference voltage, the bypass control circuit controls to electrically connect the input power source with the output power source, and operates the buck-boost switching power circuit in the bypass phase of the bypass mode. Before and/or after the bypass phase, the bypass control circuit respectively controls the buck-boost switching power circuit to operate in a first transition phase and/or a second transition phase. During the first transition phase or the second transition phase, the bypass control circuit controls the output voltage to gradually change towards the input voltage or target voltage, until the conversion voltage difference is less than the first reference voltage or the output voltage equals the target voltage.

27 Claims, 4 Drawing Sheets

(58) Field of Classification Search
CPC .......... G05F 3/262; G05F 3/265; G05F 3/267;
G05F 1/575; H02M 5/2573; H02M 1/081;
H02M 5/293; H02M 7/12; H02M 3/10;
H02M 3/125; H02M 3/13; H02M 3/135;
H02M 3/145; H02M 3/15; H02M 3/155;
H02M 3/156; H02M 3/157; H02M 3/158;
H02M 1/346; H02M 3/1588; H02M
2003/1566; H02M 3/1582; H02M 3/1584;
H02M 2003/1557; H02M 1/0032; H02M
1/4225; H02M 7/217; H02M 1/0025;
H02M 1/0045; H02M 1/0009; H02M
1/08; H02M 1/088; H02M 1/0048; H05B
39/048; B23K 11/24; H04B 2215/069
See application file for complete search history.

(56) References Cited

U.S. PATENT DOCUMENTS

| | | | |
|---|---|---|---|
| 2024/0128926 A1* | 4/2024 | Adest | H10F 77/955 |
| 2024/0250613 A1* | 7/2024 | McCue | H02M 1/0009 |

* cited by examiner

BUCK-BOOST SWITCHING REGULATOR AND CONTROL METHOD THEREOF

CROSS REFERENCE

The present invention priority to TW patent application No. 112139728, filed on Oct. 18, 2023.

BACKGROUND OF THE INVENTION

Field of Invention

The present invention pertains to a buck-boost switching regulator and its control method; more specifically, it concerns a buck-boost switching regulator designed to smoothly transition into bypass mode irrespective of the load current level, along with its associated control method.

Description of Related Art

It is well-known that buck-boost switching power converters are often required to operate in a low-power, energy-saving mode when applied in battery charging systems. In this mode, due to the continued switching of the power switches within the buck-boost converter, there are switching losses, which reduce conversion efficiency. Therefore, in the energy-saving mode, further maintaining an electrical connection between the input and output without switching the power switches (i.e., transitioning into bypass mode) can enhance conversion efficiency. However, in typical applications, transitioning into and out of bypass mode necessitates an additional switch to serve as the bypass path, thereby electrically connecting the input and output. In practical applications, situations may arise where there is a significant voltage difference between the input and output voltages. At the moment of short-circuiting in the bypass path, a relatively large current can occur. This sudden change in current can cause excessive output fluctuation, leading to the destruction of the aforementioned switch, its inductors, or the circuits connected downstream.

Please refer to FIG. 1, which shows a schematic diagram of the signal waveforms of a prior art buck-boost switching power converter. The upper panel of FIG. 1 illustrates the input voltage VIN (dashed line), two scenarios of output voltage VOUT1 and VOUT2, and the bypass control signals SBYPS1 and SBYPS2 that enable the bypass mode in the respective scenarios. When the bypass control signals SBYPS1 and SBYPS2 are high, it indicates that the buck-boost switching power converter has transitioned into the bypass mode Bypass. As previously mentioned, this known buck-boost switching power converter, when applied in battery charging system applications, enters bypass mode Bypass when the voltage difference between the input voltage VIN and either of the output voltages VOUT1 or VOUT2 is less than a reference voltage, and the input voltage VIN is greater than or equal to a first threshold. As shown in FIG. 1, when this prior art buck-boost switching power converter transitions from buck-boost mode Buck-Boost into bypass mode Bypass, the sudden change in inductor current IL, as illustrated in the lower part of FIG. 1, causes the output voltage VOUT1 to experience ringing. Not only does the excessive amplitude of the ringing in output voltage VOUT1 generate significant stress on the components, but it can also cause the buck-boost switching power converter to mistakenly trigger an overvoltage protection mechanism and exit bypass mode when the output voltage VOUT1 exceeds a second threshold. Although increasing the preset second threshold of the overvoltage protection mechanism to a third threshold could prevent the erroneous trigger, this would also increase the opportunity of overvoltage damage to the system.

In light of this, the present invention addresses the aforementioned shortcomings of the prior art by proposing a buck-boost switching power circuit that can smoothly transition into bypass mode regardless of the magnitude of the load current.

SUMMARY OF THE INVENTION

From one perspective, the present invention provides a buck-boost switching power circuit for converting an input power source into an output power source, including: a power switch circuit, including an input switch unit and an output switch unit, wherein the input switch unit is configured to switch a first end of an inductor between the input power source or a ground potential, and the output switch unit is configured to switch a second end of the inductor between the output power source or the ground potential, to convert the input power source into the output power source; and a bypass control circuit, configured to determine whether the buck-boost switching power circuit operates in a bypass mode according to a bypass enable signal; wherein, when the bypass enable signal is at an enable level, the buck-boost switching power circuit operates in the bypass mode, and when the absolute value of a conversion voltage difference between an input voltage of the input power source and an output voltage of the output power source is less than a first reference voltage, the bypass control circuit controls the power switch circuit to electrically connect the input power source with the output power source in bypass, and causes the buck-boost switching power circuit to operate in a bypass phase of the bypass mode; wherein, in the bypass mode, before the bypass phase, the bypass control circuit controls the buck-boost switching power circuit to operate in a first transition phase, and/or after the bypass mode, the bypass control circuit controls the buck-boost switching power circuit to operate in a second transition phase; wherein, during the first transition phase, the bypass control circuit controls the output voltage to gradually change towards the input voltage in a feedback regulation manner, until the conversion voltage difference is less than the first reference voltage, ending the first transition phase; wherein, during the second transition phase, the bypass control circuit controls the output voltage to gradually change towards a target voltage, until the output voltage equals the target voltage.

In one embodiment, when not in the bypass mode, the bypass control circuit enables the bypass enable signal according to a conversion voltage difference between the input voltage and an output-related voltage being less than a second reference voltage, or according to an external command, where the second reference voltage is greater than the first reference voltage; wherein the output-related voltage is the output voltage or the target voltage.

In one embodiment, during the bypass phase, when a regulation voltage difference between the input voltage and the target voltage exceeds a third reference voltage, the bypass control circuit disables the bypass enable signal, to control the buck-boost switching power circuit to end the bypass phase of the bypass mode, and commence the second transition phase.

In one embodiment, during the first transition phase of the bypass mode, the bypass control circuit gradually changes a fourth reference voltage according to the input voltage and the target voltage, and according to the fourth reference voltage in a feedback regulation manner, gradually adjusts the output voltage, thereby making the output voltage gradually change towards the input voltage until the absolute value of the conversion voltage difference is less than the first reference voltage, wherein an initial value of the fourth reference voltage is related to the target voltage.

In one embodiment, during the second transition phase, the bypass control circuit gradually changes a fourth reference voltage according to the input voltage and the target voltage, and gradually adjusts the output voltage according to the fourth reference voltage in a feedback regulation manner, thereby making the output voltage gradually change towards the target voltage until the output voltage equals the target voltage, wherein an initial value of the fourth reference voltage is related to the target voltage.

In one embodiment, during the bypass phase, an output high-side switch within the output switch unit and an input high-side switch within the input switch unit are both conducted to electrically connect the input power source with the output power source through the inductor.

In one embodiment, the buck-boost switching power circuit further includes a bypass switch, which is directly electrically connected between the input power source and the output power source, wherein the bypass control circuit, during the bypass phase, controls the bypass switch to conduct to directly electrically connect the input power source with the output power source.

In one embodiment, the bypass control circuit, during the first transition phase and/or the second transition phase, controls the output voltage in a feedback regulation manner, thereby preventing overshoot or undershoot of the output voltage.

In one embodiment, the input switch unit includes: an input high-side switch, coupled between the input power source and the first end of the inductor; and an input low-side switch or an input low-side diode, coupled between the ground potential and the first end of the inductor; wherein the input high-side switch, and the input low-side switch or the input low-side diode, are configured to switch the first end of the inductor between the input power source or the ground potential.

In one embodiment, the output switch unit includes: an output low-side switch, coupled between the ground potential and the second end of the inductor; and an output high-side switch, coupled between the output power source and the second end of the inductor; wherein the output low-side switch and the output high-side switch are configured to switch the second end of the inductor between the output power source or the ground potential.

In one embodiment, during the first transition phase, the bypass control circuit controls the buck-boost switching power circuit to enter a forced continuous conduction mode (FCCM).

In one embodiment, during the second transition phase, the bypass control circuit controls the buck-boost switching power circuit to enter or not enter a forced continuous conduction mode.

In one embodiment, the target voltage is the initial output voltage or a set voltage updated during the bypass phase.

In one embodiment, the buck-boost switching power circuit enters the bypass phase of the bypass mode only after the absolute value of the conversion voltage difference is less than the first reference voltage and both the output high-side switch and the input high-side switch are conducted.

In one embodiment, the buck-boost switching power circuit further includes an error amplification circuit, wherein the bypass control circuit includes a reference voltage generation circuit, and the error amplification circuit generates an error amplification signal according to the fourth reference voltage and an output voltage-related signal related to the output voltage, wherein the error amplification signal is configured to generate multiple switching signals for controlling the power switch circuit; wherein the bypass control circuit, during the bypass phase, further controls the buck-boost switching power circuit to stop powering at least one of the reference voltage generation circuit and the error amplification circuit, wherein the fourth reference voltage is generated by the reference voltage generation circuit according to the target voltage and the input voltage.

From another perspective, the present invention provides a control method for controlling a buck-boost switching power circuit for converting an input power source into an output power source, including: operating a buck-boost switching power circuit in a bypass mode when a bypass enable signal is at an enable level; controlling to electrically connect, by bypassing, the input power source with the output power source and to operate the buck-boost switching power circuit in a bypass phase of the bypass mode when the absolute value of a conversion voltage difference between an input voltage of the input power source and an output voltage of the output power source is less than a first reference voltage; controlling the buck-boost switching power circuit to operate in a first transition phase before the bypass phase in the bypass mode, and/or controlling the buck-boost switching power circuit to operate in a second transition phase after the bypass mode; controlling the output voltage to gradually change towards the input voltage in a feedback regulation manner until the conversion voltage difference is less than the first reference voltage to end the first transition phase; and controlling the output voltage to gradually change towards a target voltage in a feedback regulation manner until the output voltage equals the target voltage during the second transition phase.

In one embodiment, the control method further includes: enabling the bypass enable signal according to a conversion voltage difference between the input voltage and an output-related voltage being less than a second reference voltage, or according to an external command, wherein the second reference voltage is greater than the first reference voltage; wherein the output-related voltage is the output voltage or the target voltage.

In one embodiment, the control method further includes: disabling the bypass enable signal during the bypass phase when a regulation voltage difference between the input voltage and the target voltage exceeds a third reference voltage, to control the buck-boost switching power circuit to end the bypass phase of the bypass mode and commence the second transition phase.

In one embodiment, the step of controlling the output voltage to gradually change towards the input voltage until the conversion voltage difference is less than the first reference voltage during the first transition phase includes: gradually changing a fourth reference voltage according to the input voltage and the target voltage during the first transition phase of the bypass mode; and gradually adjusting the output voltage in a feedback regulation manner according to the fourth reference voltage, thereby making the output voltage gradually change towards the input voltage until the absolute value of the conversion voltage difference is less than the first reference voltage; wherein an initial value of the fourth reference voltage is related to the target voltage.

In one embodiment, the step of controlling the output voltage to gradually change towards the target voltage until the output voltage equals the target voltage during the second transition phase includes: gradually changing a fourth reference voltage according to the input voltage and the target voltage during the second transition phase; and gradually adjusting the output voltage in a feedback regulation manner according to the fourth reference voltage, thereby making the output voltage gradually change towards the target voltage until the output voltage equals the target voltage, wherein an initial value of the fourth reference voltage is related to the target voltage.

In one embodiment, the buck-boost switching power circuit includes a power switch circuit, comprising an input switch unit and an output switch unit, where the step of controlling to electrically connect, by bypassing, the input power source with the output power source and to operate the buck-boost switching power circuit in the bypass phase of the bypass mode includes: controlling both the output high-side switch in the output switch unit and the input high-side switch in the input switch unit to conduct during the bypass phase, to electrically connect the input power source with the output power source through an inductor.

In one embodiment, the buck-boost switching power circuit includes a bypass switch, which is directly electrically connected between the input power source and the output power source, where the step of controlling to electrically connect, by bypassing, the input power source with the output power source and to operate the buck-boost switching power circuit in the bypass phase of the bypass mode includes: controlling the bypass switch to conduct during the bypass phase, to directly electrically connect the input power source with the output power source.

In one embodiment, the control method further includes: controlling the buck-boost switching power circuit to enter a (FCCM) during the first forced continuous conduction mode (transition phase.

In one embodiment, the control method further includes: controlling the buck-boost switching power circuit to enter or not enter a forced continuous conduction mode during the second transition phase.

In one embodiment, the target voltage is the initial output voltage or a set voltage updated during the bypass phase.

In one embodiment, the buck-boost switching power circuit enters the bypass phase of the bypass mode only after the absolute value of the conversion voltage difference is less than the first reference voltage and both the output high-side switch and the input high-side switch are conducted.

In one embodiment, the buck-boost switching power circuit includes an error amplification circuit, a power switch circuit, and a reference voltage generation circuit; wherein the error amplification circuit generates an error amplification signal according to the fourth reference voltage and an output voltage-related signal related to the output voltage, which is used to generate multiple switching signals for controlling the power switch circuit; the control method further comprising: controlling the buck-boost switching power circuit to stop powering at least one of the reference voltage generation circuit and the error amplification circuit during the bypass phase, where the fourth reference voltage is generated by the reference voltage generation circuit according to the target voltage and the input voltage.

One of the advantages of this invention is that it can transition from boost mode, buck mode, buck-boost mode to the bypass mode smoothly, regardless of the amplitude of the load current. Another advantage is that there is no need for additional transistor switches to serve as the path for the bypass mode; instead, the input high-side switch and output high-side switch can be used directly.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
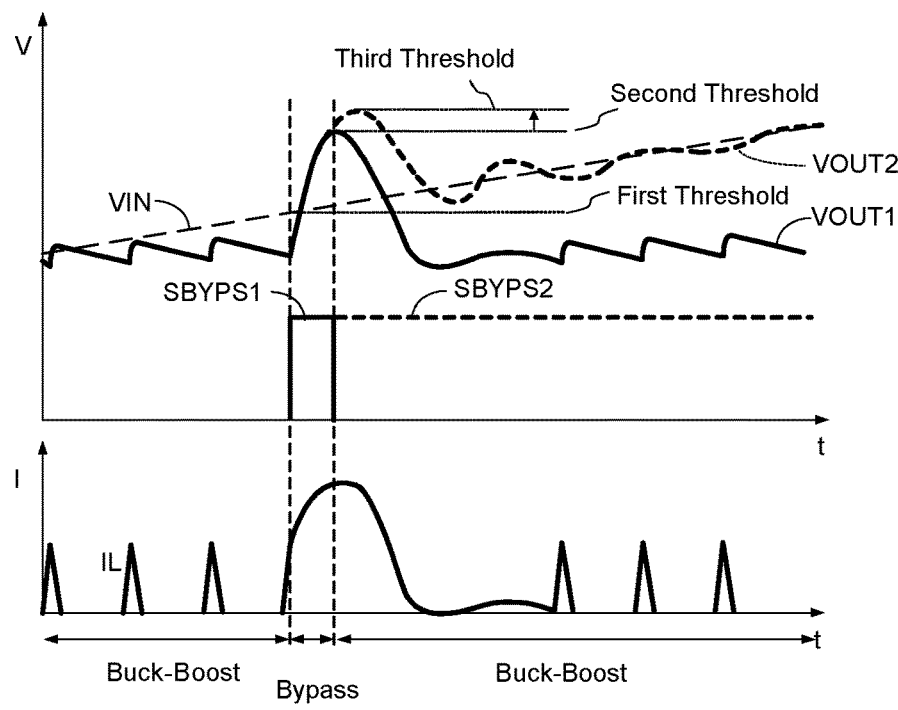
FIG. 1 illustrates signal waveform diagrams depicting signals associated with the operation of a prior art buck-boost switching regulator.
Figure 2:
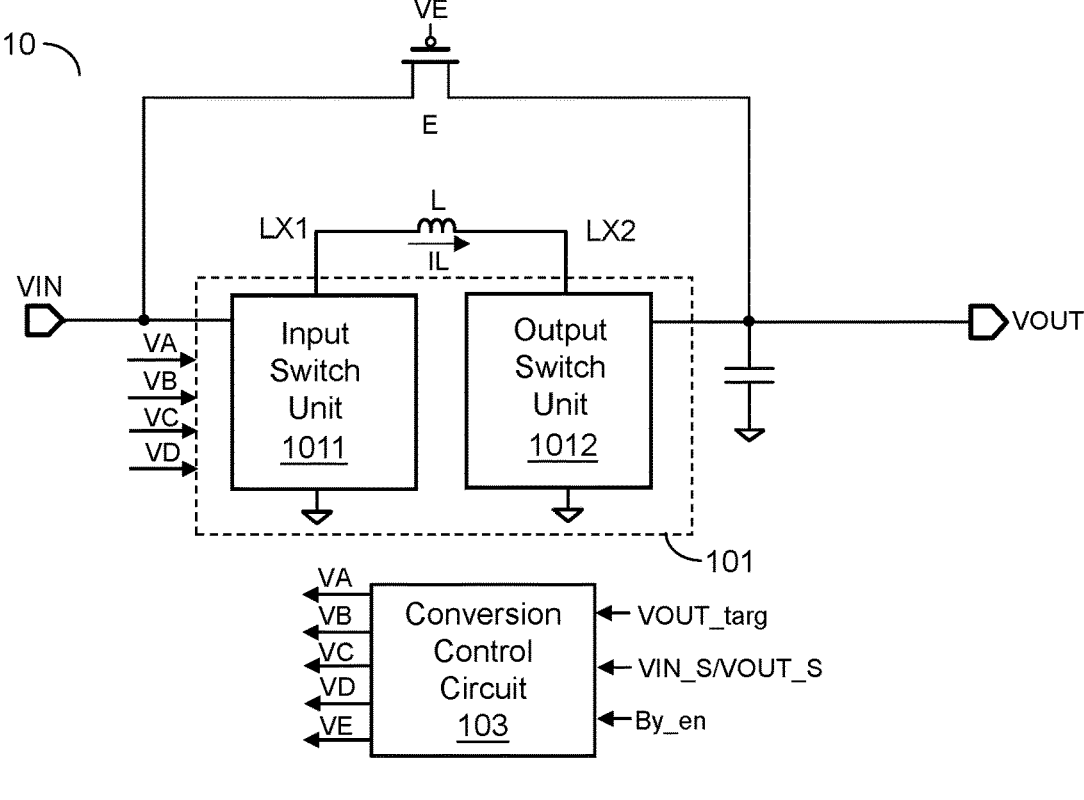
FIG. 2 shows a schematic circuit diagram of a buck-boost switching regulator according to an exemplary embodiment of the present invention.

FIG. 2 presents a circuit diagram of a buck-boost switching power circuit according to an embodiment of the present invention. As shown in FIG. 2, the buck-boost switching power circuit 10 is designed to convert an input power source into an output power source. The buck-boost switching power circuit 10 comprises a power switch circuit 101 and a conversion control circuit 103. The power switch circuit 101 includes an input switch unit 1011 and an output switch unit 1012. The input switch unit 1011 switches the first end LX1 of the inductor L between the input power source and a ground potential, while the output switch unit 1012 switches the second end LX2 of the inductor L between the output power source and a ground potential, to convert the input power source into the output power source.

Figures 3, 4:
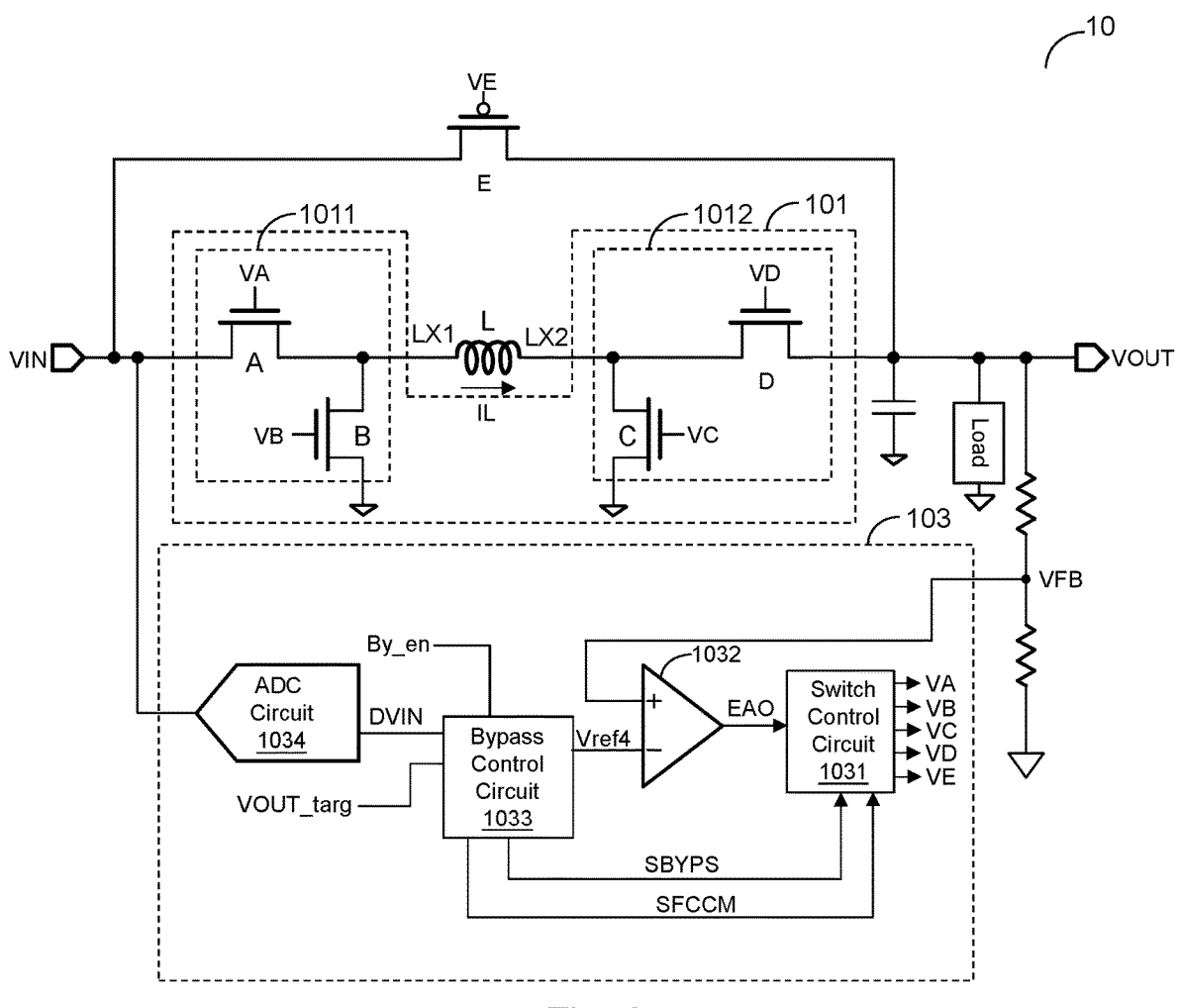
FIG. 3 shows a schematic circuit diagram of a buck-boost switching regulator according to another exemplary embodiment of the present invention.
FIG. 4 shows a schematic circuit block diagram of a bypass control circuit in a buck-boost switching regulator according to an exemplary embodiment of the present invention.

FIG. 3 shows a circuit diagram of a buck-boost switching power circuit according to another embodiment of the present invention. Referring concurrently to FIGS. 2 and 3, the conversion control circuit 103 includes a switch control circuit 1031, an error amplifier circuit 1032, a bypass control circuit 1033, and an analog-to-digital conversion circuit 1034. The analog-to-digital conversion circuit 1034 generates a digital input voltage signal DVIN according to the input voltage VIN. The error amplifier circuit 1032 compares the fourth reference voltage Vref4 with the output voltage-related signal VFB, related to the output voltage VOUT, to generate an error amplified signal EAO.

The switch control circuit 1031, in a regulation operation mode, controls the power switch circuit 101 in a pulse-width modulation manner according to the error amplified signal EAO, to convert the input power source into the output power source, generating multiple switching signals VA, VB, VC, VD for controlling the power switch circuit 101 and a switching signal VE for controlling the bypass switch E.

The bypass control circuit 1033 controls the buck-boost switching power circuit 10 to transition into and out of the bypass mode according to the bypass enable signal By_en, the digital input voltage signal DVIN, and the target voltage VOUT_targ, with the operational details to be elaborated later.

Moreover, in the bypass mode, the switch control circuit 1031 controls the operation of the power switch circuit 101 in the bypass phase according to the bypass control signal SBYPS and controls the power switch circuit 101 to enter a forced continuous conduction mode during a first transition phase and/or a second transition phase according to the forced continuous conduction control signal SFCCM, with the operational details of each mode and phase to be detailed later.

Continuing with reference to FIG. 3, the input switch unit 1011 includes an input high-side switch A and an input low-side switch B (in one embodiment, the input low-side switch B may also be an input low-side diode). The input high-side switch A is coupled between the input power source and the first end LX1 of the inductor L, while the input low-side switch B or the input low-side diode is coupled between the ground potential and the first end LX1 of the inductor L. The input high-side switch A and the input low-side switch B or input low-side diode serve to switch the first end LX1 of the inductor L between the input power source and ground potential.

Referring again to FIG. 3, the output switch unit 1012 includes an output low-side switch C and an output high-side switch D. The output low-side switch C is coupled between the ground potential and the second end LX2 of the inductor L, while the output high-side switch D is coupled between the output power source and the second end LX2 of the inductor L. The output low-side switch C and the output high-side switch D serve to switch the second end LX2 of the inductor L between the output power source and ground potential.

Referring to FIG. 3, in one embodiment, when the bypass enable signal By_en is at the enable level, the buck-boost switching power circuit 10 operates in the bypass mode. Specifically, when the absolute value of the voltage difference, i.e., the conversion voltage difference, between the input voltage VIN of the input power source and the output voltage VOUT of the output power source is less than a first reference voltage Vref1, the buck-boost switching power circuit 10 enters the bypass phase. Specifically, the bypass control circuit 1033 controls the power switch circuit 101 to electrically bypass the input and output power sources, enabling the buck-boost switching power circuit 10 to operate in the bypass phase of the bypass mode.

Referring to FIG. 3, in the bypass mode, before entering the bypass phase, the bypass control circuit 1033 controls the buck-boost switching power circuit 10 to operate in the first transition phase, and/or after the bypass mode, the bypass control circuit 1033 controls the buck-boost switching power circuit 10 to operate in the second transition phase.

As shown in FIG. 3, during the first transition phase, the bypass control circuit 1033 controls the output voltage VOUT to gradually change towards the input voltage VIN in a feedback regulation manner until the conversion voltage difference is less than the first reference voltage Vref1, thereby ending the first transition phase. It is worth noting that the gradual change is intended to prevent the amplitude of the ringing of the output voltage VOUT from exceeding the threshold of the overvoltage protection mechanism.

As shown in FIG. 3, during the second transition phase, the bypass control circuit 1033 controls the output voltage VOUT to gradually change towards the target voltage VOUT_targ in a feedback regulation manner until the output voltage VOUT equals the target voltage VOUT_targ.

In one embodiment, during the first transition phase of the bypass mode, the bypass control circuit 1033 gradually changes the fourth reference voltage Vref4 according to the input voltage VIN and the target voltage VOUT_targ. It consequently adjusts the output voltage VOUT in a feedback regulation manner according to the fourth reference voltage Vref4, making the output voltage VOUT gradually change towards the input voltage VIN until the absolute value of the conversion voltage difference is less than the first reference voltage Vref1, where the initial value of the fourth reference voltage Vref4 is related to the target voltage VOUT_targ.

In one embodiment, during the second transition phase, the bypass control circuit 1033 gradually changes the fourth reference voltage Vref4 according to the input voltage VIN and the target voltage VOUT_targ. It consequently adjusts the output voltage VOUT in a feedback regulation manner according to the fourth reference voltage Vref4, making the output voltage VOUT gradually change towards the target voltage VOUT_targ until the output voltage VOUT equals the target voltage VOUT_targ, where the initial value of the fourth reference voltage Vref4 is related to the target voltage VOUT_targ.

As shown in FIG. 3, when not operating in bypass mode (e.g., in the aforementioned regulation operation mode), the bypass control circuit 1033 enables the bypass enable signal By_en when the conversion voltage difference between the input voltage VIN and the output-related voltage is less than a second reference voltage Vref2, or, the bypass control circuit 1033 enables the bypass enable signal By_en according to an external command. In one embodiment, the second reference voltage Vref2 is greater than the first reference voltage Vref1. In one embodiment, the output-related voltage is either the output voltage VOUT or the target voltage VOUT_targ.

Continuing to refer to FIG. 3, in one embodiment, during the bypass phase, both the output high-side switch D of the output switch unit 1012 and the input high-side switch A of the input switch unit 1011 are conducted, electrically connecting the input power source to the output power source through the inductor L.

Continuing to refer to FIG. 3, in another embodiment, the buck-boost switching power circuit 10 further includes a bypass switch E, which is directly electrically connected between the input power source and the output power source. During the bypass phase, the bypass control circuit 1033 controls the bypass switch E to conduct, directly connecting the input power source with the output power source.

The bypass control circuit 1033 controls the output voltage VOUT in a feedback regulation manner during the first transition phase and/or the second transition phase to prevent overshoot or undershoot of the output voltage.

In one embodiment, the target voltage VOUT_targ is set as the initial output voltage VOUT, while in another embodiment, the target voltage VOUT_targ may be a set voltage updated during the bypass phase. In one embodiment, the buck-boost switching power circuit 10 enters the bypass phase of the bypass mode only when the absolute value of the conversion voltage difference is less than the first reference voltage Vref1.

FIG. 4, according to one embodiment of the present invention, shows a block diagram of a bypass control circuit of a buck-boost switching power circuit. As shown in FIG. 4, the bypass control circuit 1033 includes a reference voltage generation circuit 10331, which generates the fourth reference voltage Vref4 according to the target voltage VOUT_targ and the digital input voltage signal DVIN. In one embodiment, during the bypass phase, the bypass control circuit 1033 further controls the buck-boost switching power circuit 10 to stop powering at least one of the reference voltage generation circuit 10331 and the error amplifier circuit 1032 to achieve energy-saving and increase power conversion efficiency under very light load conditions.

Figure 5:
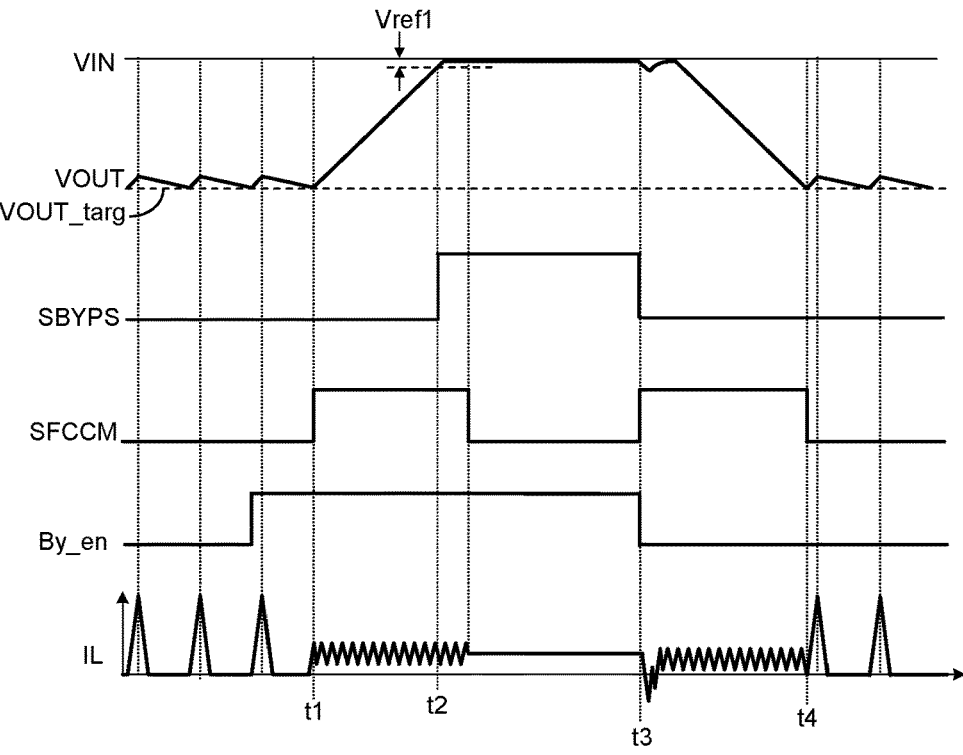
FIG. 5 illustrates signal waveform diagrams depicting signals associated with the operation of the circuitry of a buck-boost switching regulator of FIG. 3 according to an exemplary embodiment of the present invention.

Referring concurrently to FIGS. 3 and 5, FIG. 5, according to one embodiment of the present invention, shows a schematic diagram of the signal waveforms of the circuit in FIG. 3. Displayed in FIG. 5 are the input voltage VIN, output voltage VOUT, target voltage VOUT_targ, bypass control signal SBYPS, forced continuous conduction control signal SFCCM, bypass enable signal By_en, inductor current IL, and the first reference voltage Vref1. As shown in FIG. 5, in this embodiment, the bypass enable signal By_en is enabled or disabled according to an external command. In one embodiment, upon enabling the bypass enable signal By_en to transition into the bypass mode, the first transition phase starts at time t1. During the first transition phase, the bypass control circuit 1033 controls the output voltage VOUT to gradually change towards the input voltage VIN in a feedback regulation manner until the conversion voltage difference is less than the first reference voltage Vref1, ending the first transition phase. In this embodiment, the conversion voltage difference is equal to the absolute value of the difference between the input voltage VIN and the output voltage VOUT. The gradual change aims to prevent the amplitude of the ringing of the output voltage VOUT from exceeding the threshold of the overvoltage protection mechanism, specifically achieved by gradually adjusting the fourth reference voltage Vref4.

Continuing to refer to FIG. 5, when the absolute value of the conversion voltage difference between the input voltage VIN and the output voltage VOUT is less than the first reference voltage Vref1 (at time t2), the bypass control circuit 1033 controls the buck-boost switching power circuit 10 to end the first transition phase and enter the bypass phase of the bypass mode. As mentioned earlier, during the bypass phase, either through the output high-side switch D and the input high-side switch A of the input switch unit 1011 and the inductor L, or through the bypass switch E, the input power source and the output power source are electrically connected, hence from time t2 to time t3, the output voltage VOUT equals the input voltage VIN.

Continuing to refer to FIG. 5, in one embodiment, when the bypass enable signal By_en is disabled at time t3, deciding to transition out of the bypass mode, the circuit enters the second transition phase. As previously mentioned, during the second transition phase, the bypass control circuit 1033 controls the output voltage VOUT to gradually change towards the target voltage VOUT_targ until the output voltage VOUT equals the target voltage VOUT_targ. In this embodiment, the target voltage VOUT_targ remains the same as its initial value without change.

Continuing to refer to FIG. 5, in one embodiment, during both the first transition phase (from time t1 to time t2) and the second transition phase (from time t3 to time t4), as shown by the inductor current IL, the bypass control circuit 1033 controls the buck-boost switching power circuit 10 to enter the forced continuous conduction mode (FCCM) for converting between the input power source and the output power source.

Figure 6:
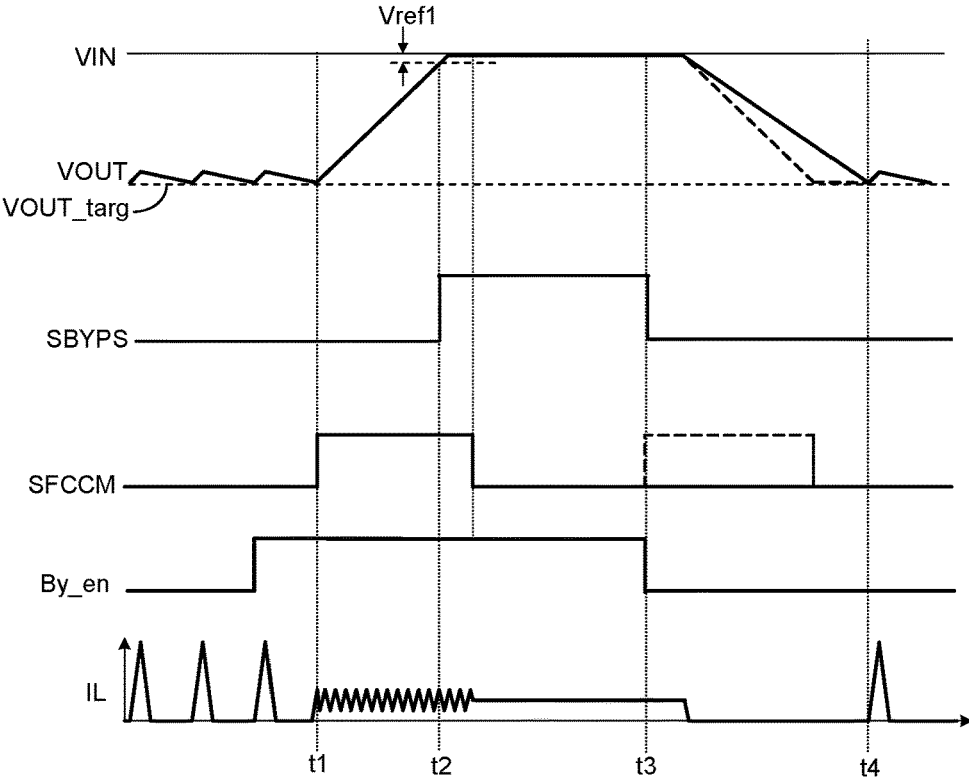
FIG. 6 illustrates signal waveform diagrams depicting signals associated with the operation of the circuitry of a buck-boost switching regulator of FIG. 3 according to another exemplary embodiment of the present invention.

Referring concurrently to FIGS. 3 and 6, FIG. 6, according to another embodiment of the present invention, shows a schematic diagram of the signal waveforms of the circuit in FIG. 3. The embodiment in FIG. 6 is similar to the embodiment in FIG. 5, with the difference being that, in the embodiment of FIG. 6, during the second transition phase (from time t3 to time t4), the bypass control circuit 1033 does not enter the forced continuous conduction mode. Specifically, in this embodiment, during the second transition phase (from time t3 to time t4), the forced continuous conduction control signal SFCCM (solid line) is disabled, the inductor current IL has no ripple and is 0, that is, the output voltage VOUT only decreases according to the load consumption (solid-lined VOUT waveform). Note that the dashed-lined VOUT waveform represents the output voltage VOUT in the forced continuous conduction mode.

Figure 7:
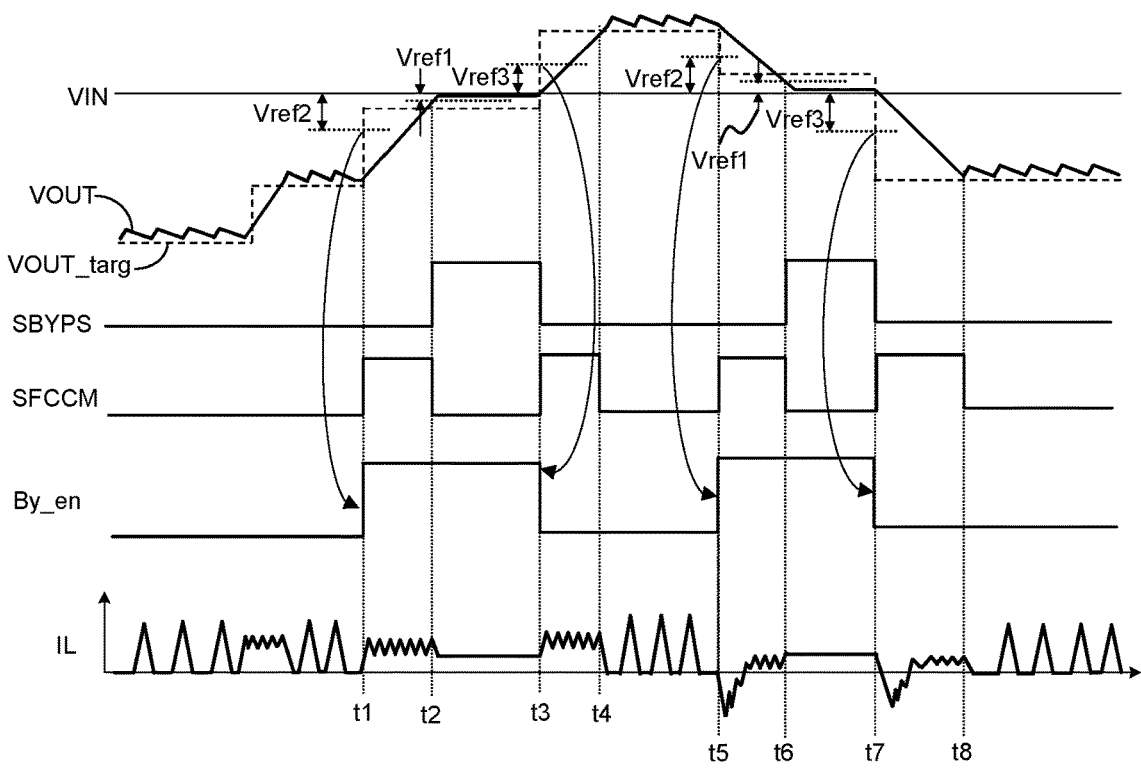
FIG. 7 illustrates signal waveform diagrams depicting signals associated with the operation of the circuitry of a buck-boost switching regulator of FIG. 3 according to yet another exemplary embodiment of the present invention.

Referring concurrently to FIGS. 3 and 7, FIG. 7, according to yet another embodiment of the present invention, shows a schematic diagram of the signal waveforms of the circuit in FIG. 3. Displayed in FIG. 7 are the input voltage VIN, output voltage VOUT, target voltage VOUT_targ, bypass control signal SBYPS, forced continuous conduction control signal SFCCM, bypass enable signal By_en, inductor current IL, the first reference voltage Vref1, the second reference voltage Vref2, and the third reference voltage Vref3. As shown in FIG. 7, in this embodiment, the bypass enable signal By_en is enabled or disabled according to the absolute value of the conversion voltage difference, adaptively determining the transitioning into or out of the bypass mode, where the conversion voltage difference refers to the voltage difference between the input voltage VIN and the output-related voltage. In this embodiment, the output-related voltage is the target voltage VOUT_targ, in other words, the conversion voltage difference refers to the voltage difference between the input voltage VIN and the target voltage VOUT_targ. In this embodiment, under the non-bypass mode, when the absolute value of the conversion voltage difference between the target voltage VOUT_targ and the input voltage VIN is less than the second reference voltage Vref2, it is determined to transition into the bypass mode. On the other hand, in the bypass mode, when the absolute value of the conversion voltage difference between the target voltage VOUT_targ and the input voltage VIN is greater than the third reference voltage Vref3, it is determined to transition out of the bypass mode.

Continuing with reference to FIG. 7, at time t1, after the target voltage VOUT_targ changes, the absolute value of the voltage difference (i.e., the conversion voltage difference) between the target voltage VOUT_targ and the input voltage VIN is less than the second reference voltage Vref2. Therefore, the bypass control circuit 1033 enables the bypass enable signal By_en, controlling the buck-boost switching power circuit 10 to transition into bypass mode, and starting the first transition phase from time t1. Specifically, the bypass control circuit 1033 controls the output voltage VOUT to gradually change towards the input voltage VIN in a feedback regulation manner until the conversion voltage difference is less than the first reference voltage Vref1, thereby ending the first transition phase. At time t2, with the conversion voltage difference being less than the first reference voltage Vref1, the bypass control circuit 1033 controls the buck-boost switching power circuit 10 to enter the bypass phase of bypass mode, electrically connecting the input power source with the output power source. Subsequently, in this embodiment, at time t3, after another change in the target voltage VOUT_targ, the conversion voltage difference between the target voltage VOUT_targ and the input voltage VIN exceeds the third reference voltage Vref3, leading the bypass control circuit 1033 to control the buck-boost switching power circuit 10 to exit the bypass phase of bypass mode and enter the second transition phase (from time t3 to t4), where the bypass control circuit 1033 controls the output voltage VOUT to gradually change towards the target voltage VOUT_targ until the output voltage VOUT equals the target voltage VOUT_targ at time t4, thus ending the second transition phase and returning to the regulation operation mode (from time t4 to t5) to adjust the output voltage VOUT to the target voltage VOUT_targ in a feedback regulation manner.

It's worth noting that before time t1, although the target voltage VOUT_targ also changed, the conversion voltage difference between the input voltage VIN and the target voltage VOUT_targ remained greater than the second reference voltage Vref2. Therefore, the bypass control circuit 1033 adaptively determines there is no need to transition into the bypass mode.

Continuing with reference to FIG. 7, subsequently from time t5 to t6, another first transition phase of a different bypass mode is entered. From time t6 to t7, the bypass phase of that other bypass mode is entered, and from time t7 to t8, another second transition phase is entered. From time t8, another regulation operation mode is entered. The modes and phases are similar to those previously described and are not elaborated further here.

Figure 8:
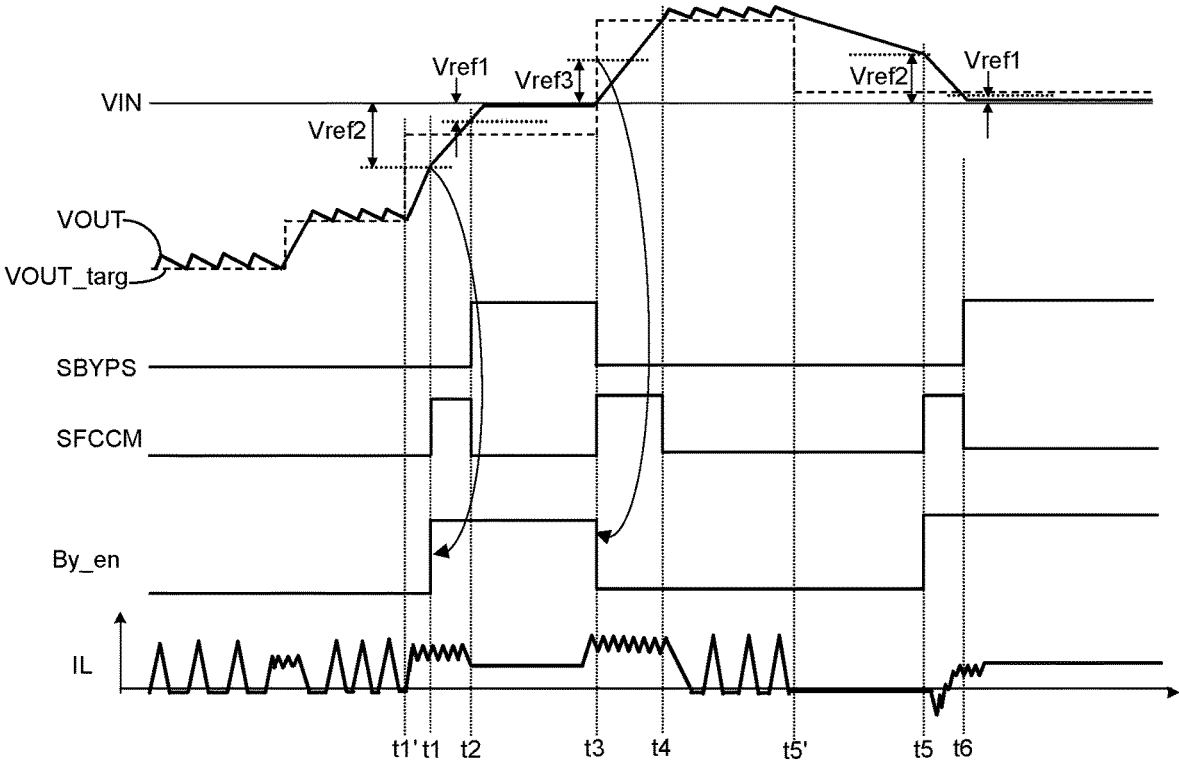
FIG. 8 illustrates signal waveform diagrams depicting signals associated with the operation of the circuitry of a buck-boost switching regulator of FIG. 3 according to still another exemplary embodiment of the present invention.

Referring concurrently to FIGS. 3 and 8, FIG. 8, according to another embodiment of the present invention, shows a schematic diagram of the signal waveforms of the circuit in FIG. 3. The embodiment in FIG. 8 is similar to the embodiment in FIG. 7, with the difference being that, in the embodiment of FIG. 8, the output-related voltage is the output voltage VOUT, that is, the conversion voltage difference configured to determine whether to transition into or out of bypass mode refers to the voltage difference between the output voltage VOUT and the input voltage VIN.

Continuing to refer to FIG. 8, at time t1', after the target voltage VOUT_targ changes, the output voltage VOUT begins to rise towards the target voltage VOUT_targ. Then, at time t1, the conversion voltage difference between the output voltage VOUT and the input voltage VIN is less than the second reference voltage Vref2, leading the bypass control circuit 1033 to enable the bypass enable signal By_en and control the buck-boost switching power circuit 10 to transition into the bypass mode. The rest of the phases, e.g., the first transition phase under the bypass mode and the second transition phase when exiting bypass mode, are similar to the embodiment in FIG. 7 and are not detailed here. Similarly, the determinations and operations at times t5' and t5 are analogous to those at times t1' and t1 and are not elaborated further.

As described, the present invention can smoothly transition into or out of the bypass mode from the boost mode, the buck mode or the buck-boost mode, through either the first transition phase or the second transition phase, regardless of the amplitude of the load current, which can effectively prevents potential overshoot or undershoot of the output voltage VOUT associated with transitioning into or out of the bypass mode.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A buck-boost switching power circuit for converting an input power source into an output power source, comprising:
   a power switch circuit, including an input switch unit and an output switch unit, wherein the input switch unit is configured to switch a first end of an inductor between the input power source or a ground potential, and the output switch unit is configured to switch a second end of the inductor between the output power source or the ground potential, to convert the input power source into the output power source; and
   a bypass control circuit, configured to determine whether the buck-boost switching power circuit operates in a bypass mode according to a bypass enable signal;
   wherein, when the bypass enable signal is at an enable level, the buck-boost switching power circuit operates in the bypass mode, and when an absolute value of a conversion voltage difference between an input voltage of the input power source and an output voltage of the output power source is less than a first reference voltage, the bypass control circuit controls the power switch circuit to electrically connect the input power source with the output power source in bypass, and causes the buck-boost switching power circuit to operate in a bypass phase of the bypass mode;

wherein, in the bypass mode, before the bypass phase, the bypass control circuit controls the buck-boost switching power circuit to operate in a first transition phase, and/or after the bypass mode, the bypass control circuit controls the buck-boost switching power circuit to operate in a second transition phase;

wherein, during the first transition phase, the bypass control circuit controls the output voltage to gradually change towards the input voltage in a feedback regulation manner, until the conversion voltage difference is less than the first reference voltage, ending the first transition phase;

wherein, during the second transition phase, the bypass control circuit controls the output voltage to gradually change towards a target voltage, until the output voltage equals the target voltage.

2. The buck-boost switching power circuit of claim 1, wherein, when not in the bypass mode, the bypass control circuit enables the bypass enable signal according to a conversion voltage difference between the input voltage and an output-related voltage being less than a second reference voltage, or according to an external command, where the second reference voltage is greater than the first reference voltage; wherein the output-related voltage is the output voltage or the target voltage.

3. The buck-boost switching power circuit of claim 1, wherein, during the bypass phase, when a regulation voltage difference between the input voltage and the target voltage exceeds a third reference voltage, the bypass control circuit disables the bypass enable signal, to control the buck-boost switching power circuit to end the bypass phase of the bypass mode, and commence the second transition phase.

4. The buck-boost switching power circuit of claim 1, wherein, during the first transition phase of the bypass mode, the bypass control circuit gradually changes a fourth reference voltage according to the input voltage and the target voltage, and according fourth reference voltage in a feedback regulation manner, gradually adjusts the output voltage, thereby making the output voltage gradually change towards the input voltage until the absolute value of the conversion voltage difference is less than the first reference voltage, wherein an initial value of the fourth reference voltage is related to the target voltage.

5. The buck-boost switching power circuit of claim 1, wherein, during the second transition phase, the bypass control circuit gradually changes a fourth reference voltage according to the input voltage and the target voltage, and gradually adjusts the output voltage according to the fourth reference voltage in a feedback regulation manner, thereby making the output voltage gradually change towards the target voltage until the output voltage equals the target voltage, wherein an initial value of the fourth reference voltage is related to the target voltage.

6. The buck-boost switching power circuit of claim 1, wherein, during the bypass phase, an output high-side switch within the output switch unit and an input high-side switch within the input switch unit are both conducted to electrically connect the input power source with the output power source through the inductor.

7. The buck-boost switching power circuit of claim 1, further comprising a bypass switch, which is directly electrically connected between the input power source and the output power source, wherein the bypass control circuit, during the bypass phase, controls the bypass switch to conduct to directly electrically connect the input power source with the output power source.

8. The buck-boost switching power circuit of claim 1, wherein the bypass control circuit, during the first transition phase and/or the second transition phase, controls the output voltage in a feedback regulation manner, thereby preventing overshoot or undershoot of the output voltage.

9. The buck-boost switching power circuit of claim 1, wherein the input switch unit includes:

an input high-side switch, coupled between the input power source and the first end of the inductor; and an input low-side switch or an input low-side diode, coupled between the ground potential and the first end of the inductor;

wherein the input high-side switch, and the input low-side switch or the input low-side diode, are configured to switch the first end of the inductor between the input power source or the ground potential.

10. The buck-boost switching power circuit of claim 1, wherein the output switch unit includes:

an output low-side switch, coupled between the ground potential and the second end of the inductor; and an output high-side switch, coupled between the output power source and the second end of the inductor;

wherein the output low-side switch and the output high-side switch are configured to switch the second end of the inductor between the output power source or the ground potential.

11. The buck-boost switching power circuit of claim 1, wherein during the first transition phase, the bypass control circuit controls the buck-boost switching power circuit to enter a forced continuous conduction mode (FCCM).

12. The buck-boost switching power circuit of claim 1, wherein during the second transition phase, the bypass control circuit controls the buck-boost switching power circuit to enter or not enter a forced continuous conduction mode.

13. The buck-boost switching power circuit of claim 1, wherein the target voltage is the initial output voltage or a set voltage updated during the bypass phase.

14. The buck-boost switching power circuit of claim 6, wherein the buck-boost switching power circuit enters the bypass phase of the bypass mode only after the absolute value of the conversion voltage difference is less than the first reference voltage and both the output high-side switch and the input high-side switch are conducted.

15. The buck-boost switching power circuit of claim 4, further comprising an error amplification circuit, wherein the bypass control circuit includes a reference voltage generation circuit, and the error amplification circuit generates an error amplification signal according to the fourth reference voltage and an output voltage-related signal related to the output voltage, wherein the error amplification signal is configured to generate multiple switching signals for controlling the power switch circuit; wherein the bypass control circuit, during the bypass phase, further controls the buck-boost switching power circuit to stop powering at least one of the reference voltage generation circuit and the error amplification circuit, wherein the fourth reference voltage is generated by the reference voltage generation circuit according to the target voltage and the input voltage.

16. A control method for controlling a buck-boost switching power circuit for converting an input power source into an output power source, comprising:

operating a buck-boost switching power circuit in a bypass mode when a bypass enable signal is at an enable level;

controlling to electrically connect, by bypassing, the input power source with the output power source and to operate the buck-boost switching power circuit in a bypass phase of the bypass mode when an absolute value of a conversion voltage difference between an input voltage of the input power source and an output voltage of the output power source is less than a first reference voltage;

controlling the buck-boost switching power circuit to operate in a first transition phase before the bypass phase in the bypass mode, and/or controlling the buck-boost switching power circuit to operate in a second transition phase after the bypass mode;

controlling the output voltage to gradually change towards the input voltage in a feedback regulation manner until the conversion voltage difference is less than the first reference voltage to end the first transition phase; and controlling the output voltage to gradually change towards a target voltage in a feedback regulation manner until the output voltage equals the target voltage during the second transition phase.

17. The control method for controlling a buck-boost switching power circuit of claim 16, further comprising:

enabling the bypass enable signal according to a conversion voltage difference between the input voltage and an output-related voltage being less than a second reference voltage, or according to an external command, wherein the second reference voltage is greater than the first reference voltage; wherein the output-related voltage is the output voltage or the target voltage.

18. The control method for controlling a buck-boost switching power circuit of claim 16, further comprising:

disabling the bypass enable signal during the bypass phase when a regulation voltage difference between the input voltage and the target voltage exceeds a third reference voltage, to control the buck-boost switching power circuit to end the bypass phase of the bypass mode and commence the second transition phase.

19. The control method for controlling a buck-boost switching power circuit of claim 16, wherein the step of controlling the output voltage to gradually change towards the input voltage until the conversion voltage difference is less than the first reference voltage during the first transition phase includes:

gradually changing a fourth reference voltage according to the input voltage and the target voltage during the first transition phase of the bypass mode; and gradually adjusting the output voltage in a feedback regulation manner according to the fourth reference voltage, thereby making the output voltage gradually change towards the input voltage until the absolute value of the conversion voltage difference is less than the first reference voltage;

wherein an initial value of the fourth reference voltage is related to the target voltage.

20. The control method for controlling a buck-boost switching power circuit of claim 16, wherein the step of controlling the output voltage to gradually change towards the target voltage until the output voltage equals the target voltage during the second transition phase includes:

gradually changing a fourth reference voltage according to the input voltage and the target voltage during the second transition phase; and gradually adjusting the output voltage in a feedback regulation manner according to the fourth reference voltage, thereby making the output voltage gradually change towards the target voltage until the output voltage equals the target voltage, wherein an initial value of the fourth reference voltage is related to the target voltage.

21. The control method for controlling a buck-boost switching power circuit of claim 16, wherein the buck-boost switching power circuit includes a power switch circuit, comprising an input switch unit and an output switch unit, where the step of controlling to electrically connect, by bypassing, the input power source with the output power source and to operate the buck-boost switching power circuit in the bypass phase of the bypass mode includes:

controlling both the output high-side switch in the output switch unit and the input high-side switch in the input switch unit to conduct during the bypass phase, to electrically connect the input power source with the output power source through an inductor.

22. The control method for controlling a buck-boost switching power circuit of claim 16, wherein the buck-boost switching power circuit includes a bypass switch, which is directly electrically connected between the input power source and the output power source, step where the of controlling to electrically connect, by bypassing, the input power source with the output power source and to operate the buck-boost switching power circuit in the bypass phase of the bypass mode includes:

controlling the bypass switch to conduct during the bypass phase, to directly electrically connect the input power source with the output power source.

23. The control method for controlling a buck-boost switching power circuit of claim 16, further comprising:

controlling the buck-boost switching power circuit to enter a forced continuous conduction mode (FCCM) during the first transition phase.

24. The control method for controlling a buck-boost switching power circuit of claim 16, further comprising:

controlling the buck-boost switching power circuit to enter or not enter a forced continuous conduction mode during the second transition phase.

25. The control method for controlling a buck-boost switching power circuit of claim 16, wherein the target voltage is the initial output voltage or a set voltage updated during the bypass phase.

26. The control method for controlling a buck-boost switching power circuit of claim 21, wherein the buck-boost switching power circuit enters the bypass phase of the bypass mode only after the absolute value of the conversion voltage difference is less than the first reference voltage and both the output high-side switch and the input high-side switch are conducted.

27. The control method for controlling a buck-boost switching power circuit of claim 19, wherein the buck-boost switching power circuit includes an error amplification circuit, a power switch circuit, and a reference voltage generation circuit; wherein the error amplification circuit generates an error amplification signal according to the fourth reference voltage and an output voltage-related signal related to the output voltage, which is used to generate multiple switching signals for controlling the power switch circuit; the control method further comprising:

controlling the buck-boost switching power circuit to stop powering at least one of the reference voltage generation circuit and the error amplification circuit during the bypass phase, where the fourth reference voltage is generated by the reference voltage generation circuit according to the target voltage and the input voltage.

*  *  *  *  *